(No Model.)  2 Sheets—Sheet 1.

C. R. VAN RUYVEN.
ALARM COUPLING FOR AIR AND STEAM BRAKES.

No. 314,758.  Patented Mar. 31, 1885.

WITNESSES:  INVENTOR:

(No Model.)
C. R. VAN RUYVEN.
ALARM COUPLING FOR AIR AND STEAM BRAKES.
No. 314,758. Patented Mar. 31, 1885.
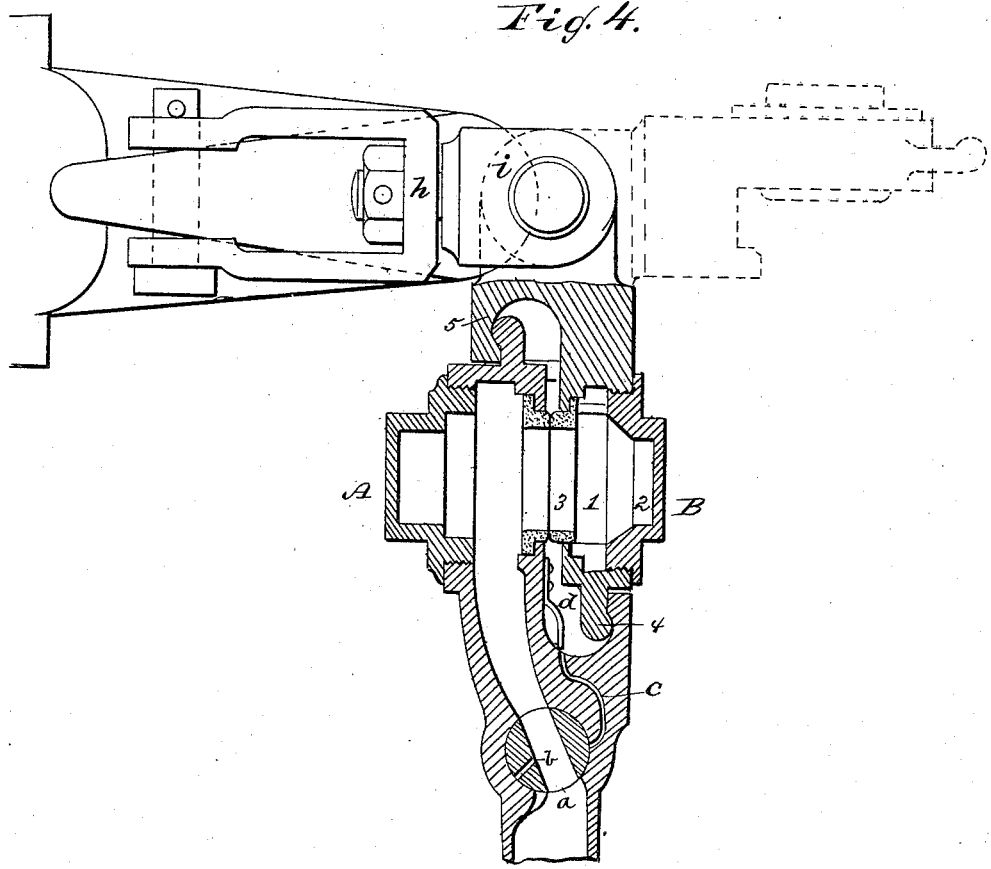
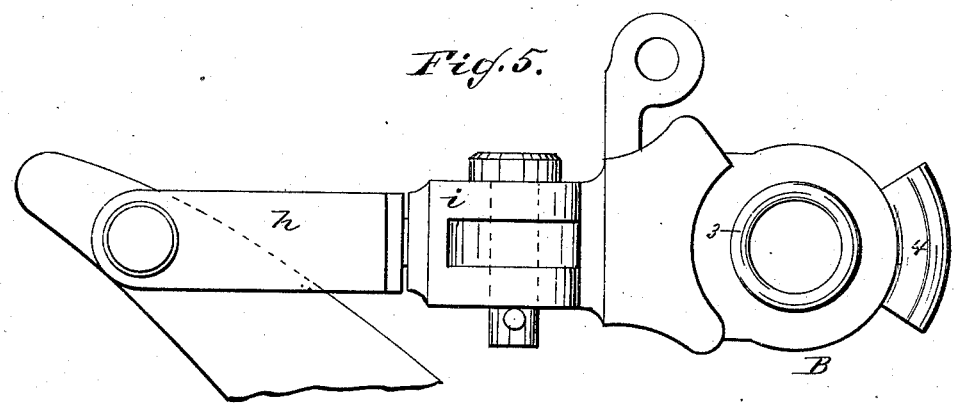
WITNESSES:
INVENTOR:
C. R. van Ruyven
BY
ATTORNEYS.

UNITED STATES PATENT OFFICE.

CORNELIUS ROELAND VAN RUYVEN, OF DEVENTER, NETHERLANDS.

ALARM-COUPLING FOR AIR AND STEAM BRAKES.

SPECIFICATION forming part of Letters Patent No. 314,758, dated March 31, 1885.

Application filed November 1, 1884. (No model.)

*To all whom it may concern:*

Be it known that I, CORNELIUS ROELAND VAN RUYVEN, a citizen of the Netherlands, and residing at Deventer, Netherlands, have invented new and useful Improvements in Alarm-Couplings for Air and Steam Brake Tubes, of which the following is a specification.

My invention relates to alarm-couplings for air and steam brake tubes, and more especially relates to improvements in the couplings for connecting the main pipes of the several vehicles.

My improved coupling is so constructed as to indicate by whistling when the cock connected therewith is not open after two vehicles have been connected, and when a coupling is not connected with the dummy-coupling, as well as when not attached to the coupling of another vehicle.

Figure 1:
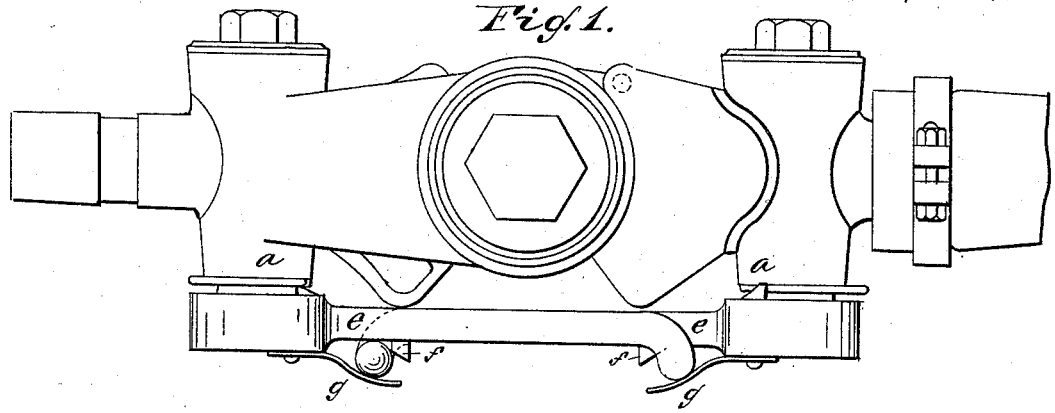
Figure 2:
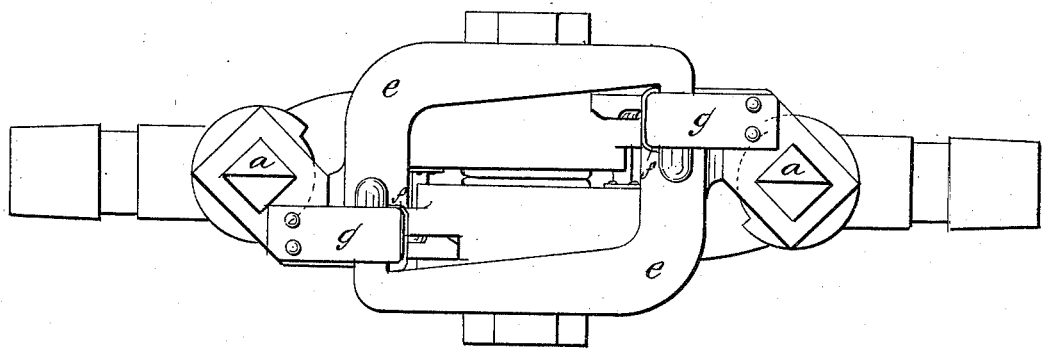
Figure 3:
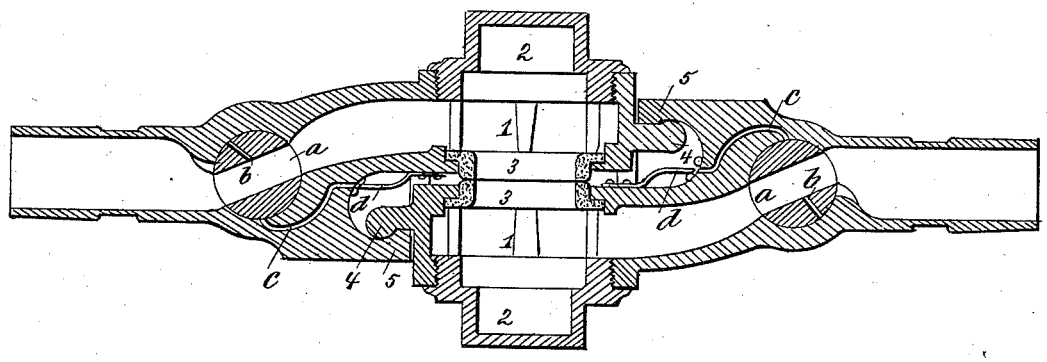

My invention is represented on the accompanying drawings, in which Figure 1 is a plan view of my improved alarm-coupling for air and steam brake tubes, two couplings being united. Fig. 2 is a side view of the same. Fig. 3 is a longitudinal sectional view. Fig. 4 is a plan view of the dummy-coupling. Fig. 5 is a side view of the same.

Each coupling (see Figs. 1, 2, 3) consists of a case, 1, cap 2, fitting onto the same, and an india-rubber packing-ring, 3, which forms an air-tight joint when two couplings are connected. Each coupling is further provided with a projection or nose, 4, and groove 5, with which the corresponding groove and projection of another coupling are adapted to engage, all of the usual construction.

In order to enable the cocks *a a* to indicate when they are closed, the plug of each, in addition to the main passage, is provided with a small passage, *b*, Fig. 3, at about right angles thereto and in connection with the main passage. When a cock is closed, the air will pass through the said small passage to the main passage, and from thence through a suitable passage, *c*, in the case to the whistle *d*. The cocks are provided with handles *e e*, which engage with each other, and are kept together by tenons *f f* and springs *g g*, so that the couplings are not liable to become disengaged and the cocks to be closed. If, however, the couplings are separated by a pull, the cocks will remain open, thus allowing the air to escape and apply the brakes.

The dummy-coupling is secured to the draw-hook of the vehicle by means of a yoke, *h*, and a joint, *i*, thus compelling a workman to disconnect the coupling A from the dummy-coupling B before he can connect two vehicles together. When the coupling is thus disconnected from the dummy-coupling, it whistles until it is connected with the corresponding coupling on the next vehicle. The workman who connects the vehicle is thus made aware when two couplings are not connected. The cocks must be closed by reason of the arrangement of the handles before two couplings can be disconnected. After this each coupling continues to whistle until it is connected with the dummy-coupling. Thus the improved coupling always whistles when it is not engaged and when the cock is locked.

Having thus described my invention and the manner of employing the same, I claim—

1. In continuous brakes, the construction of a warning or alarm coupling, A, consisting of the cocks *a*, whistles *d*, handles *e*, tenons *f*, and springs *g*, in combination with the dummy-coupling B, which is connected with the draw-hook of the vehicle by a yoke, *h*, and joint *i*, all substantially in the manner and for the purpose as described in the specification and shown in the drawings.

2. The combination, with the sections of a hose or pipe coupling and cocks therein, of whistles arranged in the said sections and passages for admitting air or steam to the whistles when the cocks are closed, substantially as described, whereby an alarm will be sounded when the sections are disconnected, as set forth.

3. In a hose-coupling, the combination, with the cap, of a plug having the usual aperture and a smaller channel, and of a whistle in the cap, to which whistle the air or steam is conducted through the small channel in the plug, substantially as herein shown and described.

In testimony whereof I have signed my name to this specification in the presence of two subscribing witnesses.

CORNELIUS ROELAND VAN RUYVEN.

Witnesses:
   FERDINAND WILLEM VAN MEURS,
   AUGUST SIEGFRIED DOCEN.